United States Patent [19]

Kita

[11] Patent Number: 5,402,961
[45] Date of Patent: Apr. 4, 1995

[54] MAGNETIC TAPE TAKE-UP SYSTEM

[75] Inventor: Akihisa Kita, Kanagawa, Japan

[73] Assignee: Fuji Photo Film Co., Ltd., Kanagawa, Japan

[21] Appl. No.: 109,438

[22] Filed: Aug. 20, 1993

[30] Foreign Application Priority Data

Nov. 19, 1992 [JP] Japan .................. 4-309933

[51] Int. Cl.⁶ .......................... B65H 19/28
[52] U.S. Cl. .................. 242/532.1; 242/534
[58] Field of Search .............. 242/532.1, 534, 344

[56] References Cited

U.S. PATENT DOCUMENTS

| | | |
|---|---|---|
| 4,328,066 | 5/1982 | Kiuchi et al. . |
| 4,512,904 | 4/1985 | King .................. 242/532.1 X |
| 4,632,335 | 12/1986 | Dickson et al. ............. 242/534 |
| 4,791,504 | 12/1988 | Igarashi et al. ............ 242/344 X |
| 4,979,690 | 12/1990 | Kita . |
| 5,247,323 | 9/1993 | Weber ................ 242/344 X |

FOREIGN PATENT DOCUMENTS

52-79907 7/1977 Japan .
60-182080 9/1985 Japan .

Primary Examiner—John M. Jillions
Attorney, Agent, or Firm—Sughrue, Mion, Zinn, Macpeak & Seas

[57] ABSTRACT

A cassette casing has tape identifying holes which are arranged in a predetermined pattern so that the pattern of the tape identifying holes represents the kind of the magnetic tape wound in the cassette casing such as the length of the magnetic tape, the properties of the magnetic layer thereon and the like. A magnetic tape take-up system which winds a magnetic tape in such a cassette casing is provided with control keys for inputting the kind of the magnetic tape to be wound, a memory which stores the pattern of the tape identifying holes which represents the kind of magnetic tape input by the control keys, and a pattern detecting mechanism which detects the pattern of the tape identifying holes born by the cassette casing positioned in the winding position, and when the pattern of the tape identifying holes stored in the memory does not conform to that detected by pattern detecting mechanism, winding of the tape is inhibited.

1 Claim, 7 Drawing Sheets

MAGNETIC TAPE TAKE-UP SYSTEM

BACKGROUND OF THE INVENTION

1. Field of the Invention

This invention relates to a magnetic tape take-up system for winding a magnetic tape around a reel in a cassette casing.

2. Description of the Prior Art

In a magnetic tape take-up system, a cassette casing (in which a pair of reels and a leader tape connected to the reels at its opposite ends are housed) is transferred to a winding position, and a magnetic tape is wound around one of the reels in the winding position. Thereafter the cassette casing is removed from the winding position. See, for instance, U.S. Pat. No. 4,979,690.

In magnetic tape cassettes such as an 8 mm video cassette, one of a plurality of kinds of magnetic tapes which differ in the length, the material of the magnetic layer and/or the method of forming the magnetic layer is wound around the reel. Accordingly, tape identifying holes arranged in a predetermined pattern are formed on the casing so that the kind of the magnetic tape in the cassette can be automatically detected when the cassette is loaded in a cassette tape recorder.

When winding a magnetic tape in a cassette casing providing with such tape identifying holes, cassette casings having thereon the tape identifying holes arranged in a pattern which represents the kind of the tape to be wound must be fed to the winding position. However, conventionally the cassette casing are fed manually by an operator and the pattern of the tape identifying holes is visually checked by the operator, which can result in feeding of a wrong cassette casing and mismatch of the casing and the magnetic tape. Conventionally such a mismatch of the casing and the magnetic tape cannot be recognized until the inspection step after the winding step.

Thus, in the conventional magnetic tape take-up system, the fact that a wrong cassette casing has been fed is recognized after the tape winding step, which results in waste of material and manhour.

Though the problem may be overcome by forming the tape identifying holes in the cassette casing after the tape winding step, it involves a problem that the cassette casing must be so structured that cuttings formed by punching the tape identifying holes do not disperse in the cassette casing, which results in increase in the manufacturing cost as disclosed, for instance, in Japanese Unexamined Patent Publication No. 60(1985)-182080.

SUMMARY OF THE INVENTION

In view of the foregoing observations and description, the primary object of the present invention is to provide a magnetic tape take-up system which can prevents the magnetic tape from being wound in a wrong cassette casing.

In accordance with the present invention, there are provided an input means which inputs the kind of the magnetic tape to be wound, a memory means which stores the pattern of the tape identifying holes which represents the kind of magnetic tape input by the tape information inputting means, and a pattern detecting means which detects the pattern of the tape identifying holes born by the cassette casing positioned in the winding position, and when the pattern of the tape identifying holes stored in the memory means does not conform to that detected by pattern detecting means, winding of the tape is inhibited.

That is, in accordance with the present invention, there is provided a magnetic tape take-up system which winds a magnetic tape in a cassette casing having tape identifying holes which are arranged in a predetermined pattern so that the pattern of the tape identifying holes represents the kind of the magnetic tape wound in the cassette casing such as the length of the magnetic tape, the properties of the magnetic layer thereon and the like, said magnetic tape take-up system comprising a magnetic tape source which supplies the magnetic tape, a casing transfer means which transfers the cassette casing to a winding position where the magnetic tape is wound in the cassette casing and removes the same therefrom, a tape winding mechanism which winds the magnetic tape supplied from the magnetic tape source in the cassette casing positioned in the winding position, a tape information inputting means which inputs the kind of the magnetic tape to be wound by the tape winding mechanism, a memory means which stores the pattern of the tape identifying holes which represents the kind of magnetic tape input by the tape information inputting means, a pattern detecting means which detects the pattern of the tape identifying holes born by the cassette casing positioned in said winding position, a determining means which determines whether the pattern of the tape identifying holes stored in the means conforms to that detected by pattern detecting means, and an inhibiting means which inhibits the tape winding mechanism from winding the tape when the determining means determines that the pattern of the tape identifying holes stored in the means does not conform to that detected by pattern detecting means.

In the magnetic tape take-up system of the present invention, that a wrong cassette casing is fed can be known before the magnetic tape is wound and accordingly waste of material and manhour can be avoided. The wrong cassette casing can be fed as it is when the magnetic tape represented by the pattern of the tape identifying holes born by the cassette casing is to be wound. Further since the pattern of the tape identifying holes is detected in the winding position where the cassette casing is precisely positioned for the winding operation, additional casing positioning means need not be provided for detection of the pattern of the tape identifying holes.

DESCRIPTION OF THE PREFERRED EMBODIMENT

Figure 3:
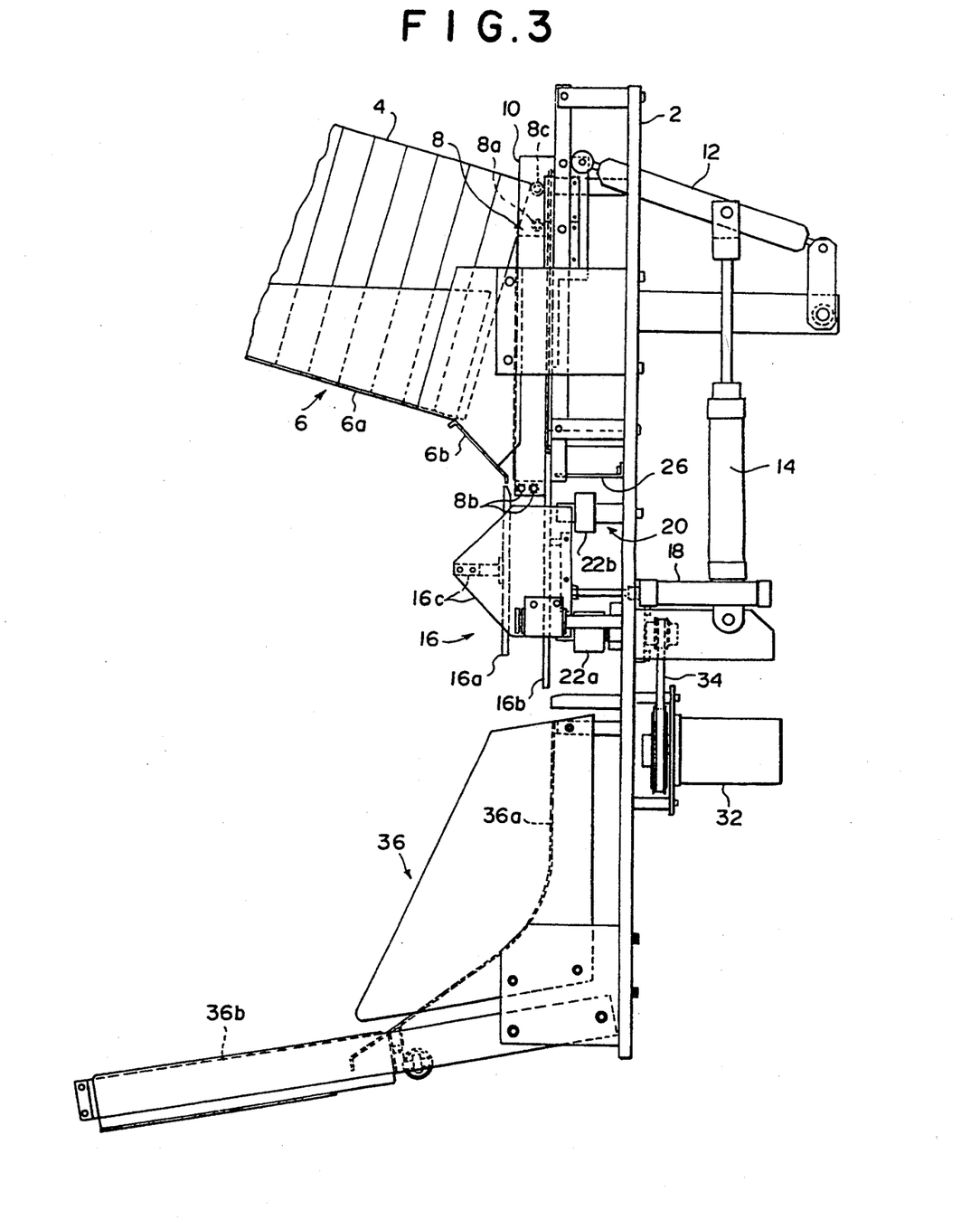
FIG. 3 is an enlarged side view of a part of the system.

As shown in FIG. 3, a hopper 6 for feeding cassette casings 4 (e.g., those for a 8 mm video tape cassette) one by one is provided on the front face of a panel 2.

Figure 4:
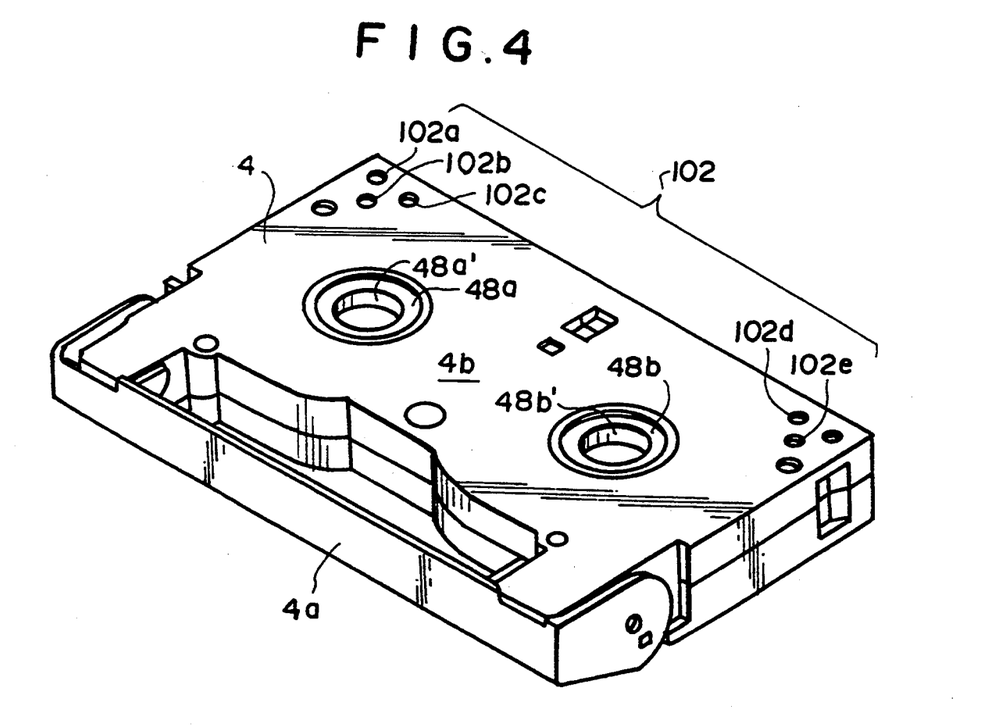
FIG. 4 is a perspective view of a cassette casing as viewed from the lower side thereof.

As shown in FIG. 4, the cassette casing 4 has a guard panel 4a on the front face thereof and has a pair of reels 48a and 48b which are supported for rotation therein. The cassette casing 4 is provided in its lower side 4b with a pair of openings which respectively give accesses to engagement holes 48a' and 48b' of the reels 48a and 48b. The cassette casing 4 is further provided with a leader tape 56 (FIG. 6) which is in continuous length and is fixed to the reels 48a and 48b at opposite ends before a magnetic tape is wound around the reels 48a and 48b as will be described later. Five blind holes 102 (102a to 102e) are formed in the lower side 4b of the cassette casing 4 at two corners thereof. Each of the blind holes 102 has a thin bottom and the bottoms of the blind holes 102 are selectively drilled according to the kind of the magnetic tape to be accommodated in the cassette casing 4. That is, the pattern of the blind holes whose bottoms have been drilled represents the kind of the magnetic tape to be accommodated in the cassette casing 4. The blind holes whose bottoms have been drilled will be referred to as "the tape identifying holes", hereinbelow.

The cassette casings 4 are put in the hopper 6 obliquely standing on their one shorter sides with the lower sides 4b facing toward the panel 2 as shown in FIG. 3.

A first transfer means 8 comprises a pair of upper guide pins 8a and 8c and a pair of lower guide pins 8b which are supported on a support plate 10. The support plate 10 is connected to a link member 12 which is driven by an air cylinder 14 to move up and down the support plate 10. That is, the support plate 10 or the first transfer means 8 is moved up and down between an uppermost position and a casing delivery position via a casing receiving position.

The casing receiving position is slightly below the uppermost position, and the first transfer means 8 receives the cassette casing 4 from the hopper 6 in the casing receiving position as will be described in detail later. In the casing delivery position, the first transfer means 8 delivers the casing 4 to a second transfer means 16.

The hopper 6 has a bottom plate 6a which is inclined downward toward the panel 2 and the cassette casings 4 are positioned on the bottom plate 6a leaning toward the panel 2 so that the upper end is positioned nearer to the panel 2 than the lower end as shown in FIG. 3. A feed-out plate 6b which inclines downward toward the panel 2 at a larger angle than the bottom plate 6a extends from the end of the bottom plate 6a toward the panel 2.

The second transfer means 16 is provided on the panel 2. The second transfer means 16 comprises front and rear retainer plates 16a and 16b which are connected by a connecting member 16c spaced from each other by a distance slightly larger than the thickness of the cassette casing 4. The second transfer means 16 is moved left and right as seen in FIG. 3 by an air cylinder 18 connected to the rear retainer plate 16a between a casing receiving position which is shown in FIG. 3 and in which it receives the cassette casing 4 from the first transfer means 8 and a winding position where the engagement holes 48a' and 48b' of the reels 48a and 48b are engaged with a drive shaft 22a and an idler shaft 22b of a tape winding mechanism 20 and a magnetic tape 74 is wound around the reel 48a.

Figure 1:
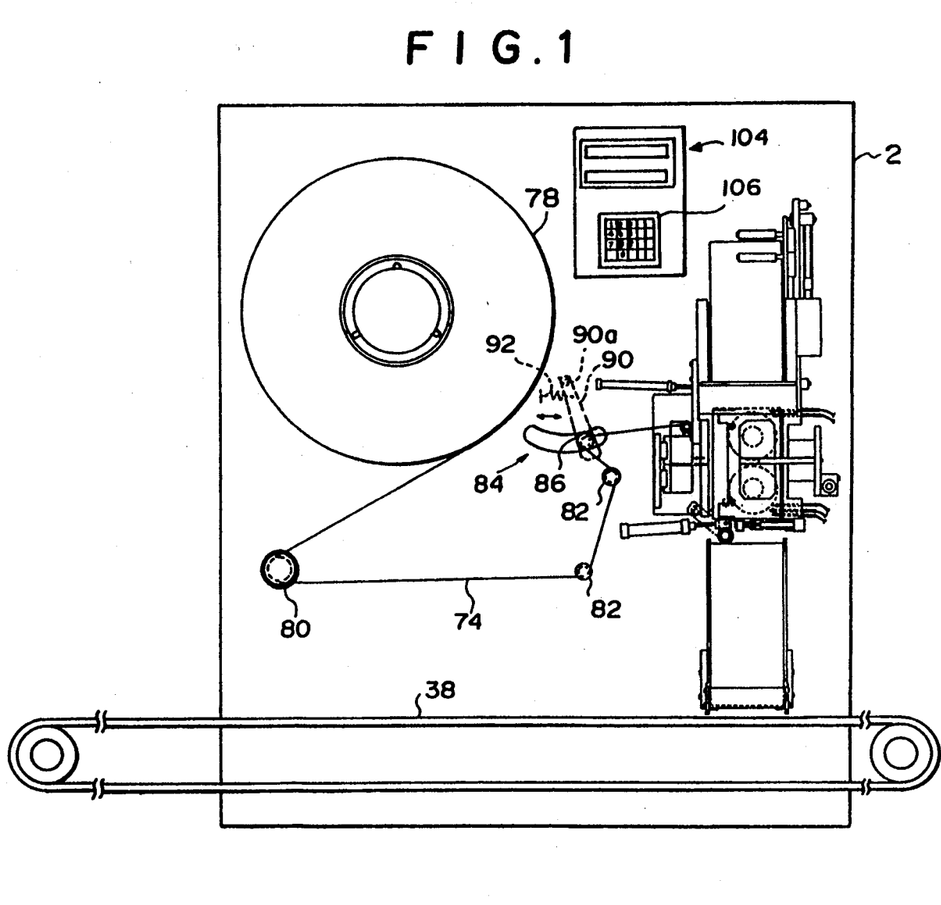
FIG. 1 is a schematic front view of a magnetic tape take-up system in accordance with an embodiment of the present invention.

As shown in FIG. 1, the panel 2 is provided with a controller 104 which has control switches 106 in the form of a key board. A tape reel 78 is mounted on the panel 2 and the magnetic tape 74 in a continuous length is wound around the tape reel 78. The operator operates the control switches 106 and inputs information regarding the kind of the magnetic tape to be wound around the reel 48a such as the length, the properties of the magnetic layer, and the like. For example, the length of the tape may be input as the size of the product, e.g., P6-30, or P6-60) or as the length of the tape to be wound around the reel 48a. The properties of the magnetic layer may be input as a code representing the properties. The controller 104 has a built-in memory 210 (FIG. 8) and stores in the memory the pattern of the tape identifying holes 102 corresponding to the kind of the tape input by the operator.

The operator manually supplies to the hopper 6 the cassette casings 4 bearing thereon the tape identifying holes 102 arranged in the pattern corresponding to the kind of the tape input by the operator.

Figure 2:
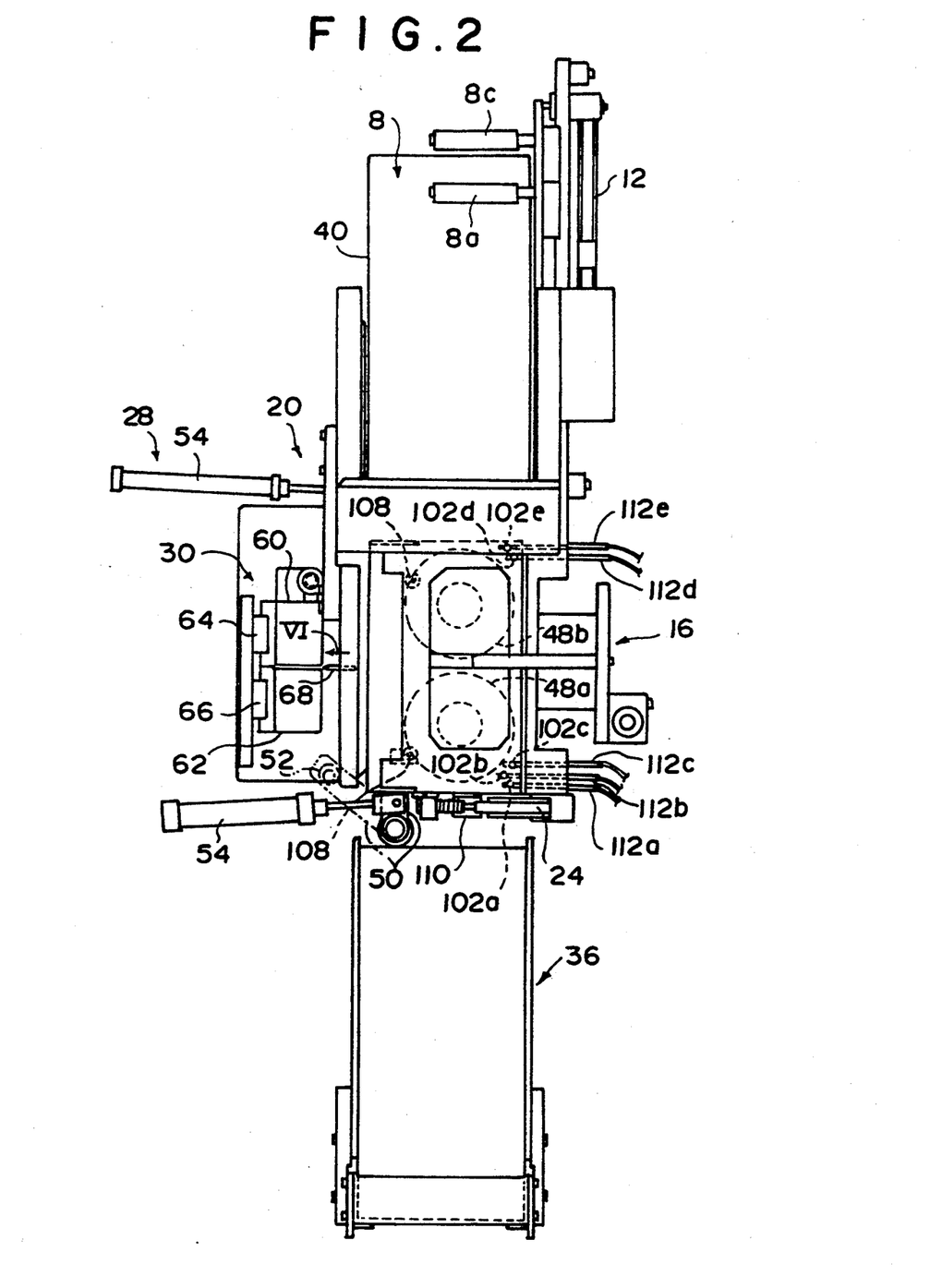
FIG. 2 is an enlarged front view of a part of the system.

As shown in FIG. 2, the panel 2 is provided with a pair of locator pins 108 and a guide member 110 for positioning the cassette casing 4 in the winding position. Further the panel 2 is provided with five optical fiber type reflective photo-sensors 112a to 112e which are respectively opposed to the five blind holes 102a to 102e when the cassette casing 4 is positioned in the winding position. The photo-sensors 112a to 112e detect whether the bottoms of the blind holes opposed thereto are drilled, thereby detecting the pattern of the tape identifying holes 102.

Figure 8:
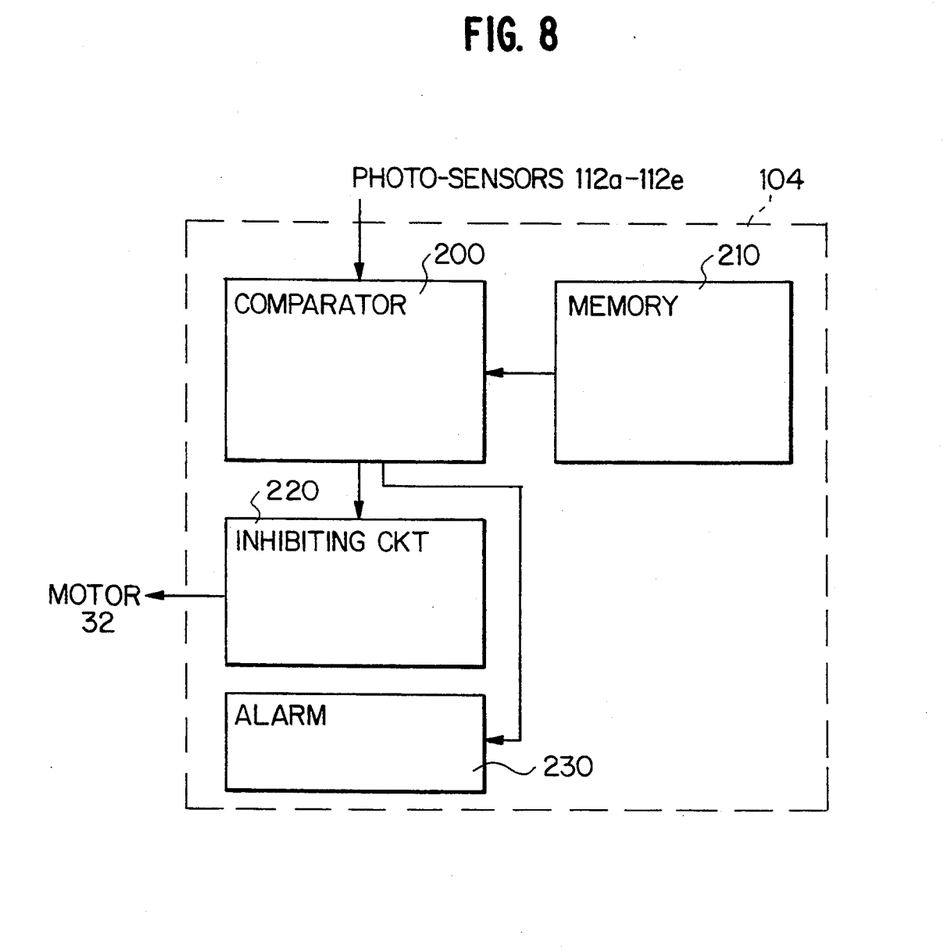
FIG. 8 is a block diagram showing various circuits of the controller of the invention.

The controller 104 detects whether the pattern of the tape identifying holes 102 detected by the photo-sensors 112a to 112e conforms to that stored in the memory. When it is determined that the former does not conform to the latter, the controller 104 inhibits tape winding operation and energizes an alarm such as a buzzer or a lamp. FIG. 8 shows the controller 104, including the determining circuit as comparator 200 and inhibiting circuit 220. Also shown is alarm 230 responsive to comparator 200.

As shown in FIGS. 2 and 3, the tape winding mechanism 20 comprises a drive shaft 22a which is adapted to be engaged with the engagement hole 48a' of the reel 48a, an idler shaft 22b which is adapted to be engaged with the engagement hole 48b' of the reel 48b, a lock release mechanism 24 (FIG. 2) which releases lock of the guard panel 4a on the front face of the cassette casing 4, a guard panel opening mechanism 26 which opens the guard panel 4a, a leader tape drawing mechanism 28 (FIG. 2) which draws the leader tape 56 out of the cassette casing 4 and a splicing system 30 (FIG. 2) which splices the leader tape 56 and the magnetic tape 74. The drive shaft 22a is driven by a driving motor 32 by way of a belt 34.

A cassette chute 36 is disposed below the second transfer means 16 and receives the cassette casing 4 dropped by the second transfer means 16 and delivers it to a belt conveyor 38 as will be described in more detail later.

The operation of the system of this embodiment will be described hereinbelow.

Figure 5A:
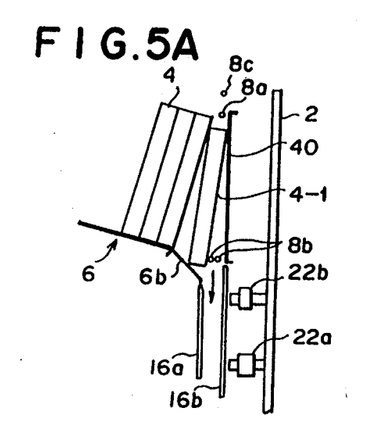
FIGS. 5A to 5F are schematic views for illustrating the manner of transferring the cassette casing.

First the first transfer means 8 is positioned in the uppermost position shown in FIG. 5A. In this state, the lowermost cassette casing 4-1 is supported in a state where the lower edge of the upper side rests on the feed-out plate 6b, the lower portion of the lower side 4b abuts against the lower guide pin 8b and the upper edge of the lower side 4b leans against a back plate 40 fixed to the panel 2.

Figure 5B:
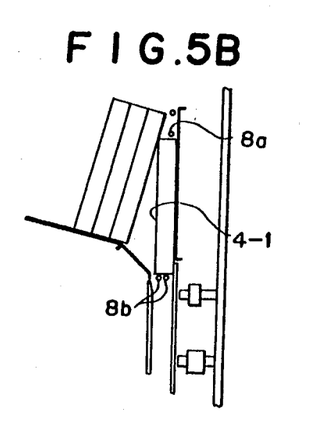
Figure 5C:
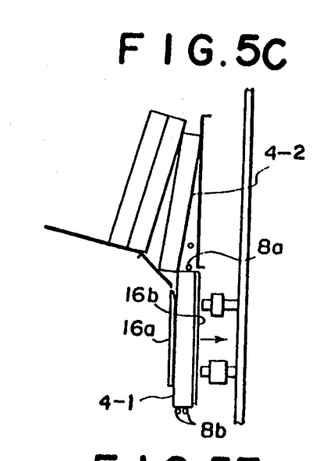

When the first transfer means 8 is slightly lowered to the casing receiving position shown in FIG. 5B, the lower guide pins 8b is moved below the lower edge of the lower side 4b of the cassette casing 4-1 and the lower edge of the upper side of the cassette casing 4-1 slides down toward the back plate 40 under the gravity, whereby the cassette casing 4-1 is positioned between the upper and lower guide pins 8a and 8b. Then when the first transfer means 8 is further lowered to the casing delivery position shown in FIG. 5C, the cassette casing 4-1 is inserted between the front and rear retainer plates 16a and 16b of the second transfer means 16 which is in its casing receiving position shown in FIG. 5C. When the second transfer means 16 is thereafter moved right to the winding position shown in FIG. 5D, the cassette casing 4-1 is positioned by the locator pins 108 and the guide member 110 and the engagement holes 48a′ and 48b′ of the reels 48a and 48b are brought into engagement with the drive shaft 22a and the idler shaft 22b of the winding mechanism 20.

In the winding position, the photo-sensors 112a to 112e detect the pattern of the tape identifying holes 102 born by the cassette casing 4-1. Then the controller 104 detects whether the pattern of the tape identifying holes 102 detected by the photo-sensors 112a to 112e conforms to that stored in the memory. When it is determined that the former does not conform to the latter, the controller 104 inhibits tape winding operation and energizes an alarm such as a buzzer or a lamp as described above.

Figures 5D, 5E:
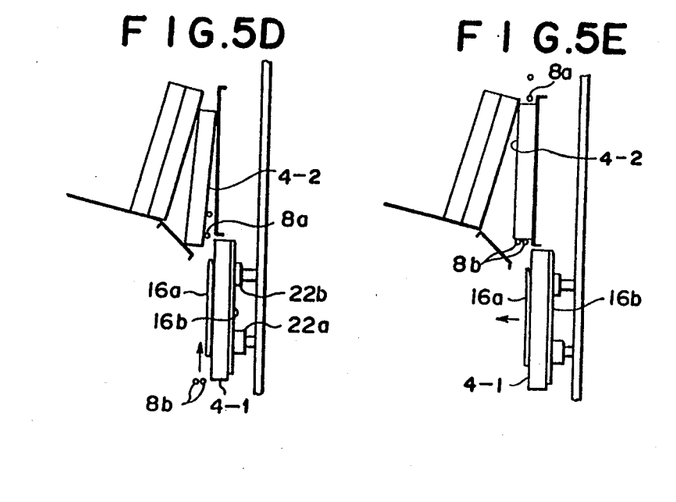

When the lowermost cassette casing 4-1 is moved downward, the second lowermost cassette casing 4-2 moves toward the back plate 40 under the gravity but is held by the upper guide pin 8c in a position where the lower portion of the lower side 4b is spaced from the back plate 40. After the second transfer means 16 is moved to the winding position, the first transfer means 8 is lifted to the casing receiving position while the upper guide pin 8c is pushing the second cassette casing 4-2 away from the back plate 40 as shown in FIG. 5D, and when the upper guide pin 8a clears the upper edge of the lower side 4b of the cassette casing 4-2, the lower edge of the upper side of the cassette casing 4-2 slides down toward the back plate 40 under the gravity, whereby the cassette casing 4-2 is positioned between the upper and lower guide pins 8a and 8b as shown in FIG. 5E.

Figure 5F:
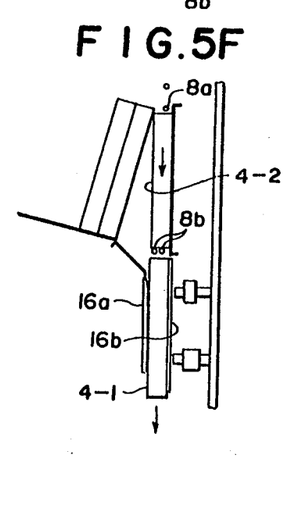

In the winding position, the magnetic tape 74 is wound around the reel 48a in the manner which will be described later, so long as the pattern of the tape identifying holes 102 detected by the photo-sensors 112a to 112e conforms to that stored in the memory. After the magnetic tape 74 is wound around the reel 48a, the second transfer means 16 is returned to the casing receiving position while the first transfer means 8 held in the casing receiving position as shown in FIG. 5F. The second transfer means 16 has no function of supporting the cassette casing 4 against the gravity, and the cassette casing 4 is supported by the pair of lower guide pins 8b of the first transfer means 8 when the second transfer means 16 receives the cassette casing 4 and is supported by the drive shaft 22a and the idler shaft 22b when the second transfer means 16 is moved to the winding position. Accordingly, when the second transfer means 16 is returned to the casing receiving position carrying the cassette casing 4-1 after the magnetic tape 74 is wound around the reel 48a, there is no means for supporting the cassette casing 4-1 against the gravity but the friction between the lower side 4b of the cassette casing 4-1 and the surface of the rear retainer plate 16b of the second transfer means 16. Thus the cassette casing 4-1 falls onto a curved guide plate 36a (FIG. 3) of the cassette chute 36 under the gravity as soon as the second transfer means 16 is returned to the casing receiving position or pushed by the lower guide pins 8b of the first transfer means 8 when the first transfer means 8 is moved to the casing delivery position carrying the second lowermost cassette casing 4-2.

The cassette casing 4 which falls on the curved guide plate 36a is changed with its position to lie on its lower side 4b and slides onto the belt conveyor 38 through a horizontal guide plate 36b (FIG. 3).

The steps described above are repeated.

It is preferred that the cassette casing 4 be provided with a non-slip tape on the lower side 4b in order to damp the drop impact.

In the winding position, the lock release mechanism 24 in the form of a cylinder device (FIG. 2) releases lock of the guard panel 4a on the front face of the cassette casing 4, and the guard panel opening mechanism 26 opens the guard panel 4a. These mechanisms are well known in the art and accordingly will not be described here. Then the leader tape drawing mechanism 28 draws the leader tape 56 out of the cassette casing 4.

As shown in FIG. 2, the leader tape drawing mechanism 28 comprises a pair of drawing arms 50 provided with drawing pins 52 and a pair of air cylinders 54 which respectively drive the drawing arms 50. The drawing arms 50 are in the position shown by the solid line in FIG. 2 until the cassette casing 4 is transferred to the winding position, and when the cassette casing 4 is transferred to the winding position, the drawing pins 52 are inserted behind the leader tape 56. The guard panel 4a has been opened by this time, and the drawing arms 50 are swung to the position shown by the chained line by the air cylinders 54, whereby the leader tape 56 is drawn out.

The splicing system 30 cuts the leader tape 56 and splices the leading end of the magnetic tape 74 to the cut end of the leading portion of the leader tape 56 (the portion connected to the reel 48a) and trailing end of the magnetic tape 74 to the cut end of the trailing portion of the leader tape 56 (the portion connected to the reel 48b). The splicing system 30 comprises a pair of splicing tables 60 and 62, a pair of slide mechanisms 64 and 66, a tape cutter 68 and a splicing mechanism 70 (FIG. 2).

Figures 7A, 7B:
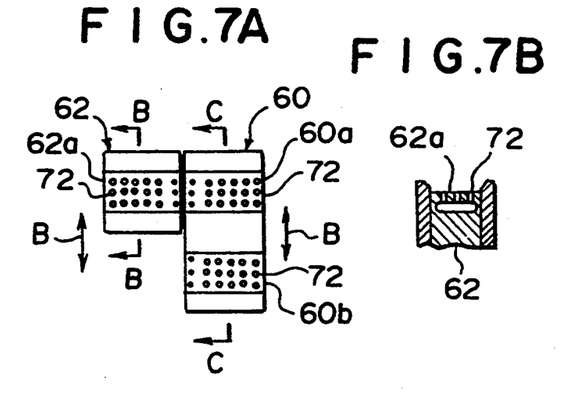
FIGS. 7A to 7C are views for illustrating the structure of the splicing tables.
Figure 7C:
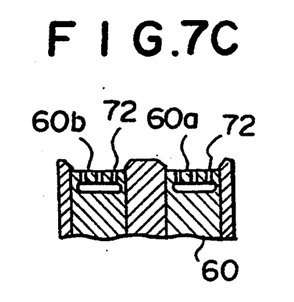

As shown in FIGS. 7A to 7C, the splicing table 60 is provided with a pair of parallel grooves 60a and 60b and the splicing table 62 is provided with a single groove 62a. A plurality of suction holes 72 which are connected to a suction source (not shown) are provided in the grooves 60a, 60b and 62a. The splicing tables 60 and 62 are slid back and forth in the direction of arrow B in FIG. 7A by the slide mechanisms 64 and 66 (FIG. 2).

Figure 6A:
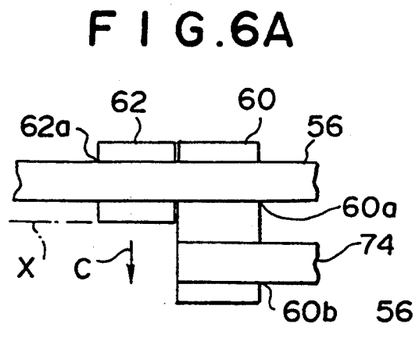
FIGS. 6A to 6D are schematic views as viewed in the direction of arrow VI in FIG. 2 for illustrating the manner of splicing the leader tape and the magnetic tape.

The leader tape 56 is drawn out by the drawing arms 50 to the position near the splicing tables 60 and 62 as shown in FIG. 6A. In this state, the leader tape 56 is positioned near the grooves 60a and 62a of the splicing tables 60 and 62 and held in the surfaces of the grooves 60a and 62a under the suction force applied to the suction holes 72. Further the leading end portion of the magnetic tape 74 in a continuous length wound around the tape reel 78 has been held in the groove 60b under the suction force applied to the suction holes 72. (In FIGS. 6A to 6D, the chained line X is a reference line indicating the position of the splicing tables 60 and 62.) In this state, the tape cutter 68 is moved between the splicing tables 60 and 62 to cut the leader tape 56. The splicing table 62 holding thereon the cut end portion of the leading portion of the leader tape 56 is slid in the direction of arrow C in FIG. 6A so that the groove 62a thereon is aligned with the groove 60b on the other splicing table 60 as shown in FIG. 6B, whereby the cut end of the leader tape 56 is caused to abut against the leading end of the magnetic tape 74 held in the groove 60b.

Figure 6B:
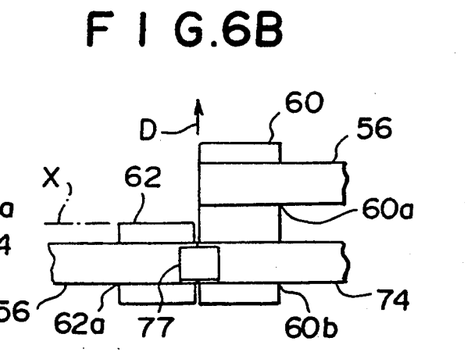

In this state, the splicing mechanism 70 applies a piece of splicing tape 77 over the cut end of the leader tape 56 and the leading end of the magnetic tape 74 as shown in FIG. 6B, thereby splicing the magnetic tape 74 and the leader tape 56. Thereafter the splicing tables 60 and 62 are slid in the direction of arrow D in FIG. 6B while keeping the position relative to each other to the position shown in FIG. 6C.

Figure 6C:
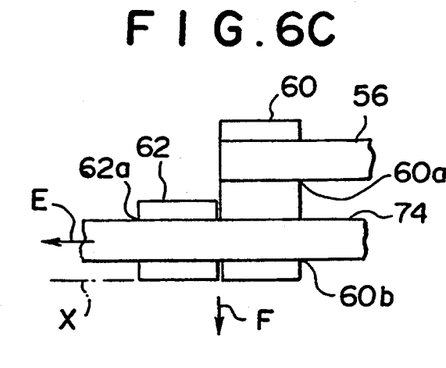

Then supply of suction force to the suction holes 72 in the groove 60b and 62a is cut to release the leader tape 56 and the magnetic tape 74, and the drive motor 32 is energized to rotate the reel 48a, whereby the tape 74 runs in the direction of arrow E in FIG. 6C and is wound around the reel 48a. As shown in FIG. 1, the magnetic tape 74 is drawn out from the tape reel 78 by way of a counter roller 80, guide rollers 82 and a tension apply means 84 and is wound around the reel 48a under a constant tension. The tension apply means 84 comprises a tension roller 86 around which the magnetic tape 74 is passed, an arm 90 which supports the tension roller 86 and is rotatable about a pivot 90a and a spring 92 which pulls the arm 90 in the direction of the arrow.

Figure 6D:
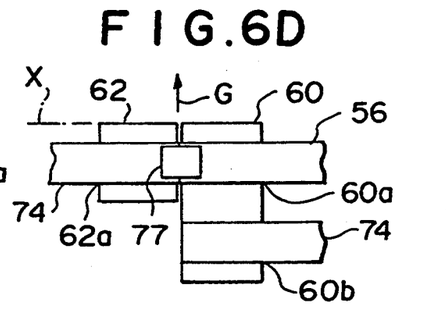

When the magnetic tape 74 is wound around the reel 48a in a predetermined length, the drive motor 32 is stopped, and the magnetic tape 74 attracted on the grooves 60b and 62a under the suction force applied to the suction holes 72. Then the tape 74 is cut between the splicing tables 60 and 62 by the tape cutter 68. Thereafter the splicing tables 60 and 62 are slid in the direction of arrow F while the groove 62a on the splicing table 62 is brought into alignment with the groove 60a on the splicing table 60 as shown in FIG. 6D, whereby the cut end of the magnetic tape 74 is caused to abut against the cut end of the trailing portion of the leader tape 56. Then the splicing mechanism 70 applies a piece of splicing tape 77 over the cut end of the leader tape 56 and the leading end of the magnetic tape 74 as shown in FIG. 6D.

After the cut end of the magnetic tape 74 is spliced to the cut end of the trailing portion of the leader tape 56, the splicing tables 60 and 62 are slid in the direction of arrow G to the position shown in FIG. 6A and supply of suction to the suction holes 72 in the grooves 60a and 62a is cut to release the tapes. Then drawing arms 50 are returned to the position shown by the solid line in FIG. 2 and the drive motor 32 is energized again to wind around the reel 48a the portion of the magnetic tape 74 and the leader tape 56 which are outside the casing 4.

The splicing system 30 described above are of known type and will not be described in more detail here. See, for instance, U.S. Pat. No. 4,328,066, Japanese Unexamined Patent Publication No. 52(1977)-79907 and the like.

After the magnetic tape 74 is thus wound around the reel 48a, the cassette casing 4 is transferred to the casing receiving position by the second transfer means 16 while the guard panel 4a is closed on the way thereto.

As can be understood from the description above, in the magnetic tape take-up system of this embodiment, that a wrong cassette casing is fed can be known before the magnetic tape is wound and accordingly waste of material and manhour can be avoided. Further in this embodiment, the pattern of the tape identifying holes is detected in the winding position where the cassette casing 4 is precisely positioned, and accordingly additional casing positioning means need not be provided for detection of the pattern of the tape identifying holes.

What is claimed is:

1. A magnetic tape take-up system which winds a magnetic tape in a cassette casing having tape identifying holes which are arranged in a predetermined pattern so that the pattern of the tape identifying holes represents the kind of the magnetic tape wound in the cassette casing such as the length of the magnetic tape, the properties of the magnetic layer thereon and the like, said magnetic tape take-up system comprising a magnetic tape source which supplies the magnetic tape, a casing transfer means which transfers the cassette casing to a winding position where the magnetic tape is wound in the cassette casing and removes the same therefrom, a tape winding mechanism which winds the magnetic tape supplied from the magnetic tape source in the cassette casing positioned in the winding position, a tape information inputting means which inputs the kind of the magnetic tape to be wound by the tape winding mechanism, a memory means which stores the pattern of the tape identifying holes which represents the kind of magnetic tape input by the tape information inputting means, a pattern detecting means which detects the pattern of the tape identifying holes born by the cassette casing positioned in said winding position, a determining means which determines whether the pattern of the tape identifying holes stored in the memory means conforms to that detected by pattern detecting means, and an inhibiting means which inhibits the tape winding mechanism from winding the tape when the determining means determines that the pattern of the tape identifying holes stored in the memory means does not conform to that detected by pattern detecting means.

* * * * *